United States Patent [19]

Tsai

[11] Patent Number: 5,940,191
[45] Date of Patent: *Aug. 17, 1999

[54] COLORED OPTICAL SENSING MODULE

[75] Inventor: Jenn-Tsair Tsai, Hsinchu, Taiwan

[73] Assignee: Mustek Systems, Inc., Hsinchu, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/677,238

[22] Filed: Jul. 9, 1996

[51] Int. Cl.$^6$ .............................. H04N 1/46; H04N 9/09; H04N 5/225; H04N 3/14

[52] U.S. Cl. .................... 358/512; 358/512; 348/265; 348/262; 348/273; 348/245; 348/272; 348/227; 348/266; 348/225

[58] Field of Search .............................. 358/512; 348/265, 348/262, 273, 272, 227, 266, 225, 245

[56] References Cited

U.S. PATENT DOCUMENTS

| | | | |
|---|---|---|---|
| 4,760,441 | 7/1988 | Kohno | 348/278 |
| 5,665,963 | 1/1996 | Campbell | 358/512 |

*Primary Examiner*—Edward L. Coles
*Assistant Examiner*—Twyler Lamb
*Attorney, Agent, or Firm*—W. Wayne Liauh

[57] ABSTRACT

Colored optical sensing module comprising a color adjustment device positioned in front of a colored charge coupler device array. The color adjustment device purifies the color component of the image data input into the charge coupler device array. The present invention also discloses a image scanner comprising said color adjustment device.

3 Claims, 4 Drawing Sheets

COLORED OPTICAL SENSING MODULE

FIELD OF THE INVENTION

The present invention relates to a colored optical sensing module, especially to a colored optical sensing module with color adjustment functions.

BACKGROUND OF THE INVENTION

The computerized image processing is a technology widely used in the industry. Before being processed by a computer, image data shall be input into a computer system with a digital image input device. Digital image input devices include: digital video camera, digital still camera, optical scanner etc. Among them, the optical scanner provides the function to input in a digitized format image data which are recorded in two-dimensional recording media. The optical scanner is inexpensive and has became a standard office equipment.

In the conventional optical scanner, the charge coupler device is used as the sensing element. The charge coupler device picks up the image components carried by the light beams entering into it, converts them into electronic signals and outputs the signals. Due to the fact that the charge coupler device is sensible to the brightness (gray level) of the input light, special arrangements shall be necessary when the charge coupler device is used as a input device for colored images.

U.S. Pat. No. 4,809,062 disclosed a color optical scanner with a roller. In this invention, a roller with filters of the three original colors, each filter for one original color, is at a up-stream position relative to the charge coupler device and is driven by a stepping motor. The filters with each original color pass by the charge coupler device sequentially. At any time point at most one filter passes by the indicence position of the charge coupler device through which the incidence light beam is filtered and only the original color components of the input light is allowed to enter the charge coupler device and is sensed by the charge coupler device. In the following time period the roller rotates to a second angle so that the next original colored filter enters into the scanning position. The original color components of the incidence light beam will be sensed by the charge coupler device. And so on.

Under such design, charge coupler devices which are sensible to the brightness of the incidence light, may be used to scan colored image data.

U.S. Pat. No. 5,122,911 relates to a filter device for a optical color scanner. The filter device has a longitudinal frame in which four filtering windows are provided. Among the four windows three are provided for three color filters, each for one original color. A driving control device controls the relative position between the charge coupler device and any one of the three original color filters. Within any time period only one of the color filter locates at the incidence position to the charge coupler device. When one scanning (e.g. scanning a page of a document) is completed, another filter is driven to proceed to the scanning position. Another scanning is then processed. This approach is called the sequential scanning and provides the function of color scanning for image data.

In another conventional art, the "color charge coupler device" or "color CCD" is employed in the color scanning. Here, the so-called "color CCD" means CCD's coated with colored filter or colored membrane. Due to the fact that CCD's are fine components, coating of the color filter or color membrane involved complicated processed. Effective method to steam color filter onto CCD's is still not industrially feasible. To be simplified, only one color is coated on the surface of a CCD chip.

In the application of the "color CCD's", three CCD's, each coated with an original color membrane, are employed where each CCD serves to scan image data components of one original color. Digitized color image data are obtained after the combination of the three original-colored image data components, processed by computer software or electronic circuits.

Among the above-described three approaches, the color CCD approach is the most popular one. This is mainly because the small dimension of the CCD helps to minimize the dimension of the system. It is however pointed out that several shortages are incurred from using the original-color membrane as the filtering means.

FIG. 1 illustrates the spectrum of light as filtered by filters of the three original color, sensed by CCD's. As shown in the figure, within the wave length between 400 nm to 700 nm, the spectrum of light as filtered by blue colored filter distributes between 400 nm to 500 nm, by green filter distributes between 480 nm to 580 nm and by red filter distributes between 560 nm to 700 nm. Overlaps take place in between the original colors. In other words, light as filtered by a filter of an original color may be not of an original color; Cross talk with other original color(s) is found. This cross talk becomes noise in the processing of image data. Further processing to eliminate the noise is thus required in order to obtain correct image data of an original color.

Due to the above-described fact, image data as scanned would require corrections, resulted at time-consuming processing and high costs for the image processing system.

PURPOSES OF THE INVENTION

It is the purpose of this invention to provide a novel color optical sensing module which is able to minimize the cross talk between original colors in the processing of color image data.

A further purpose of this invention is to provide a low-cost color adjustment device which is able to minimize the cross talk between image data of different original color.

BRIEF DESCRIPTION OF THE INVENTION

According to this invention a color optical sensing module is provided wherein a color adjustment device is prepared and is positioned at the up-steam direction of the charge coupler device. The color component of image data is purified before it enters the charge coupler device. The cross talk between color components of different original color is thus minimized.

The above and other purposes and advantages of this invention may be fully understood from the detailed description by referring to the following drawings:

In the figures.

DETAILED DESCRIPTION OF THE INVENTION

Figure 1:
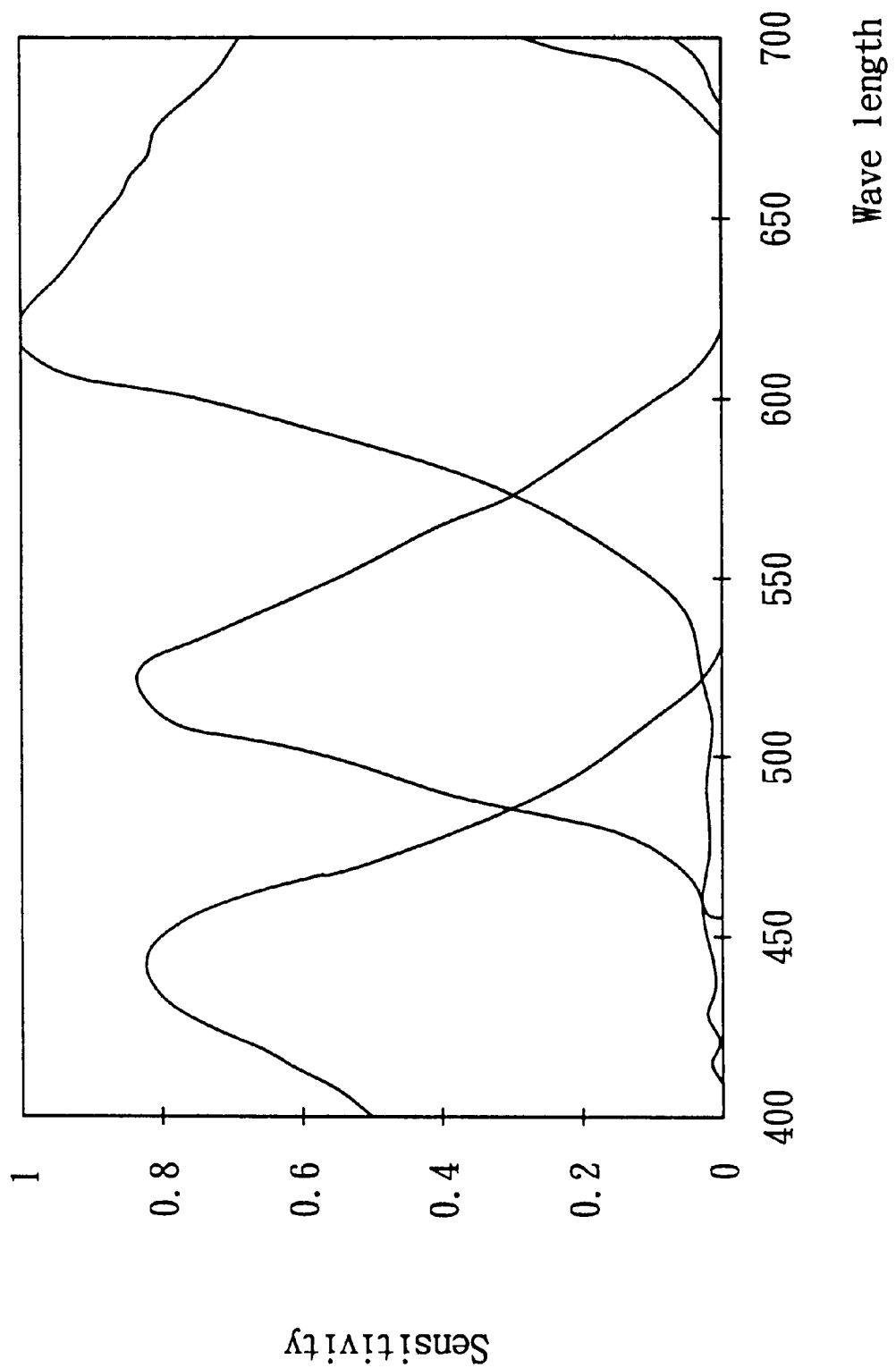
FIG. 1 illustrates the spectrum of light as filtered by filters of the three original color, sensed by CCD's.
Figure 2:
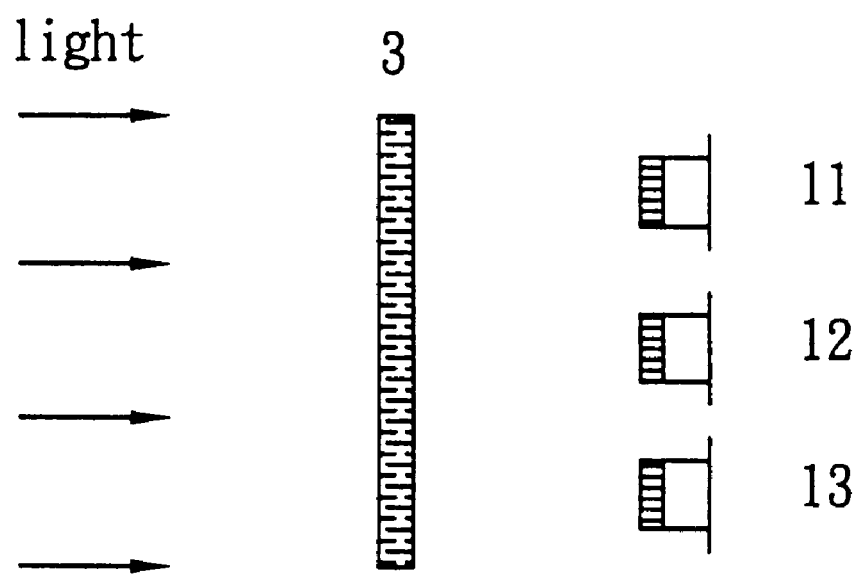
FIG. 2 illustrates the structure of one embodiment of the color optical sensing module of the present invention.

FIG. 2 illustrates the structure of one embodiment of the color optical sensing module of the present invention. As shown in the figure, three charge coupler devices (CCD's) 11, 12 and 13 are provided in the color optical sensing module of this invention. On the surface of each CCD a filter membrane of an original color is prepared. Each of the CCD's 11, 12 and 13 serves to sense light of an original color. These three CCD's 11, 12 and 13 constitute "color CCD's".

Color adjustment device 3 is positioned at the entering position of light to the three CCD's 11, 12 and 13. The color adjustment device 3 allows light beam of narrow bandwidth to penetrate through. No light beams except that with the following wave length may pass the color adjustment device 3:

Blue light: 415 nm to 490 nm;

Green light: 520 nm to 580 nm; and

Red light: 600 nm to 700 nm.

Color adjustment device 3 suited in this invention include filter coated with a narrow bandwidth filtering membrane. In practice, the narrow bandwidth filtering membrane allows light wave with the following wave length to pass through:

Blue light: 415 nm to 490 nm;

Green light: 520 nm to 580 nm; and

Red light: 600 nm to 700 nm.

Figure 3:
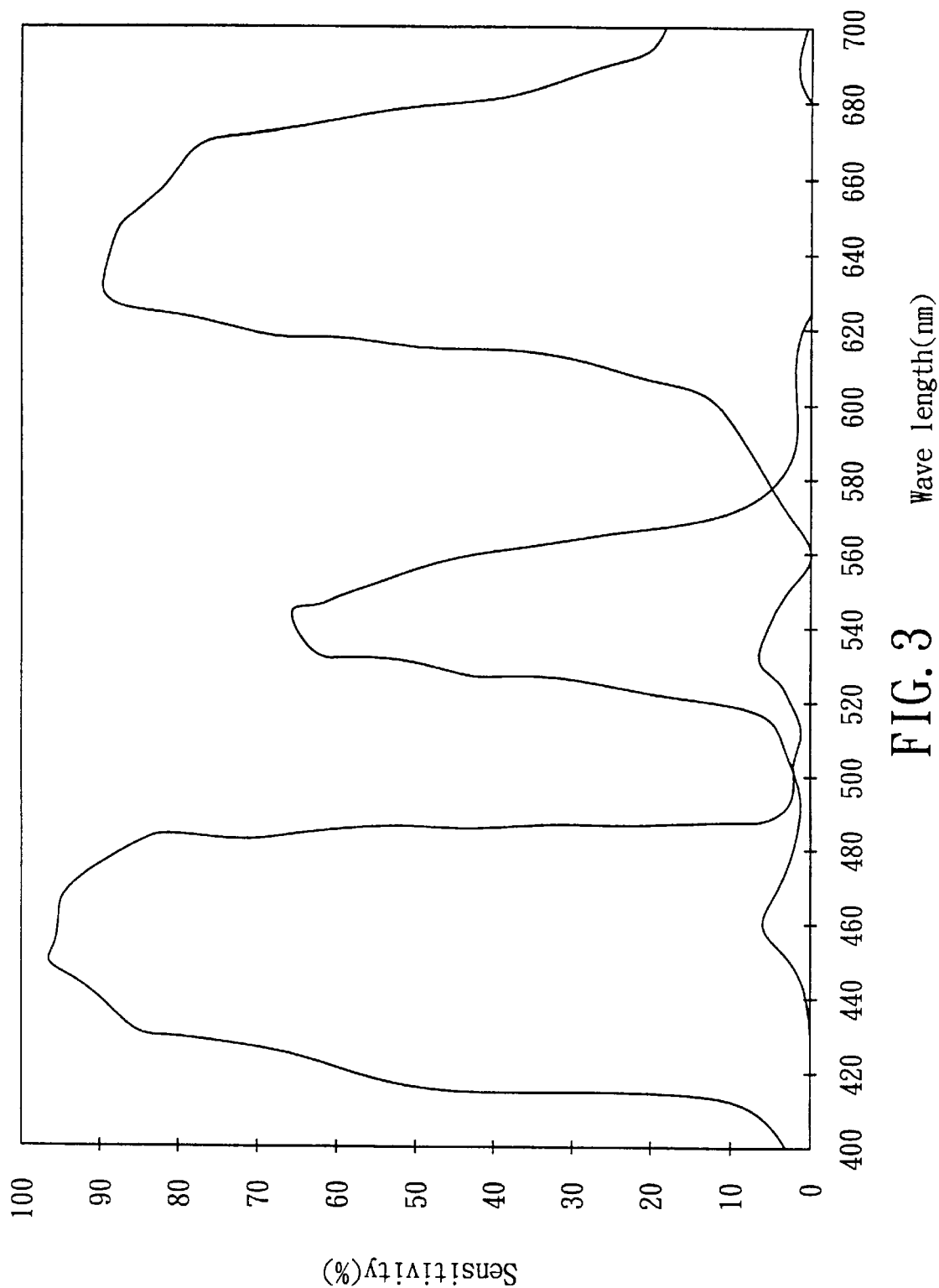
FIG. 3 illustrates the spectrum of light corrected by the color adjustment device of the present invention, as sensed by CCD's.

FIG. 3 illustrates the spectrum of light corrected by the color adjustment device of the present invention, as sensed by CCD's. As shown in the figure, the wave length of light passing through the color adjustment device 3 concentrates around the area of the three original colors. Cross talk between original colors is minimized.

Figure 4:
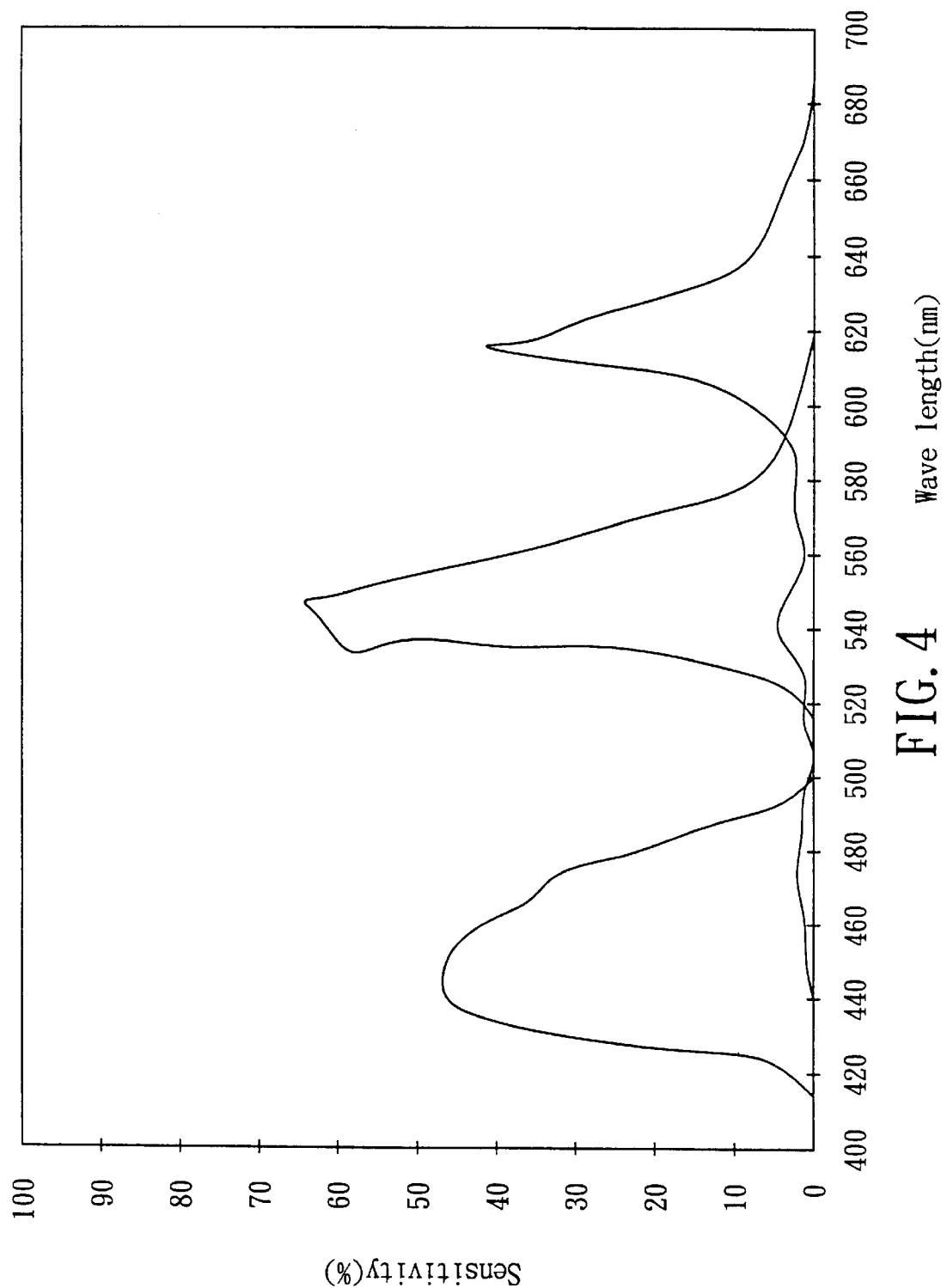
FIG. 4 illustrates the spectrum of light filtered by filters of the three original color and corrected by the color adjustment device of the present invention, as sensed by CCD's.

FIG. 4 illustrates the spectrum of light filtered by filters of the three original color and corrected by the color adjustment device of the present invention, as sensed by CCD's. As shown in the figure, the wave length of light passing through the filters 11, 12 and 13 and the color adjustment device 3 concentrates around the following areas:

Blue light: 420 nm to 485 nm;

Green light: 525 nm to 570 nm; and

Red light: 605 nm to 740 nm.

Almost no cross talk between original colors will occur and become noises in the processing of color image data.

Although this invention shall not be limited by any theory, it is indicated that the dramatic effective of this invention may be explained as follows:

Give a function L(λ) of the spectrum of the light source, a function F(λ) of the spectrum of the color adjustment device and a function R(λ) of the red-color filter, G(λ) to the greed-color filter and B(λ) to the blue-color filter.

If the sensibility of brightness of each sensor of the CCD's is:

$$L_R = \int_{\lambda 2}^{\lambda 1} L(\lambda)R(\lambda)d\lambda;$$

$$L_G = \int_{\lambda 2}^{\lambda 1} L(\lambda)G(\lambda)d\lambda; \text{ and}$$

$$L_B = \int_{\lambda 2}^{\lambda 1} L(\lambda)B(\lambda)d\lambda;$$

wherein represent the initial value and final value of the spectrum of the light source, the sensibility of brightness of the sensors of the CCD's will be:

$$L_R = \int_{\lambda 2}^{\lambda 1} L(\lambda)F(\lambda)d\lambda;$$

$$L_G = \int_{\lambda 2}^{\lambda 1} L(\lambda)F(\lambda)d\lambda;$$

$$L_B = \int_{\lambda 2}^{\lambda 1} L(\lambda)F(\lambda)d\lambda;$$

As a result, light components may not enter into a CCD except that of the same color of such CCD.

EFFECTS OF THE INVENTION

As described above, the color optical sensing module of this invention is able to purify the color component of scanning light of a desired color. Cross talk may be minimized before the scanning light enters into the CCD's. The processing of image data is thus simplified.

The color adjustment device as described above may be positioned between a color filter and its corresponding CCD. The invention is not only suited in optical scanning device employing color CCD's but also that employing color filters.

As the embodiment of the present invention is described above, those skilled in the art may derive.

What is claimed is:

1. A color optical sensing module comprising:

an optical image sensing element array to sense the brightness of incidence light beams and convert said brightness into an electronic format, said optical image sensing element array comprising a plurality of charge coupler devices each said charge coupler device being coated with a color filter corresponding to an original color; and a color adjustment device, positioned at an incidence position of said optical image sensing element array;

wherein said color adjustment device allows at least narrow bandwidth light beams with wave lengths around the three original colors to pass through with reduced cross-talk among said three original colors and to be sensed by said optical image sensing element array.

2. The color optical sensing module of claim 1 wherein the wave lengths of light beams allowed to pass through said color adjustment device include:

415 nm–490 nm, 520 nm–580 nm and 600 nm–700 nm.

3. A color image scanner comprising:

a light source to emit scanning light beams;

an optical image sensing element array to sense the brightness of incidence light beams and to convert said brightness into an electronic format, said optical image sensing element array comprising a plurality of charge coupler devices each said charge coupler device being coated with a color filter corresponding to an original color; and a color adjustment device, positioned at said incidence direction of said optical sensing array;

characterized in that said color adjustment device allows light beams with the following wave length to pass through:

blue light: 420 nm–485 nm;

green light: 525 nm–570 nm; and red light: 605 nm–640 nm wherein by reducing the bandwidth of said blue, green and red colors, said color adjustment device reduces cross-talks among said blue, green and red colors.

* * * * *